3,280,215
MODIFICATION OF EPOXY POLYMER WITH COUMARONE-INDENE RESIN
Wesley A. Severance, Brecksville, and Jerry L. Hall, Parma, Ohio, assignors to The Ceilcote Company, Inc., Cleveland, Ohio, a corporation of Ohio
No Drawing. Filed Sept. 10, 1962, Ser. No. 222,641
13 Claims. (Cl. 260—829)

The present invention relates to the modification of an epoxy resin with a polymer of a coal-tar distillate. More particularly, the invention relates to use of a modifying polymer which is a coumarone-indene resin to thereby provide a modified epoxy resin composition which, when mixed with fillers and pigments, is suitable for use as a coating or lining.

It is an object of the present invention to provide an economical epoxy resin composition which can be pigmented with many different pigments and still have a desirable balance of physical properties including good flexibility, good tensile properties and excellent corrosion resistance.

It is an object of the present invention to provide an epoxy resin composition which makes an excellent coating for steel and concrete including a flexible corrosion resistance lining for a tank.

The present invention provides a method of making an epoxy resin composition by using a coumarone-indene resin as a modifier for the resin and a compatible curing agent such as tetra ethylene pentamine or N-aminoethylpiperazine.

It is an object of the present invention to provide a composition for coating steel and concrete that has excellent properties including good corrosion resistance and flexibility, the composition being made by modifying an epoxy resin with a polymer of a coal-tar distillate such as a coumarone-indene resin and a curing agent that is compatible with the epoxy resin and cures the same at atmospheric temperatures.

These and other objects will be aparent from the specification that follows and from the appended claims.

The present invention provides a modified epoxy resin composition having improved flexibility and resiliency and having the property of being pigmented in almost any color in contrast to coal tar pitch modified compositions which are all colored black by the addition of the pitch. The improved epoxy resin composition is adapted for an excellent, strong, tough, flexible coating over steel or concrete and generally comprises 50 parts by weight of an epoxy resin, about 5 to 75 parts by weight of a polymer of a coal-tar distillate and preferably a coumarone-indene resin, and about 5 to 25 parts by weight of a curing agent for the epoxy resin.

In some applications, increased flexibility and resilience is obtained by modifying 50 parts by weight of epoxy resin with at least 5 parts by weight of the coumarone-indene resin to provide a commercially acceptable coating for concrete or a liner for tanks, etc. Generally, while as low as five and as high as 75 or even up to 79 to 80 parts by weight of coumarone-indene resin can be used as the modifier per 50 parts of epoxy resin, by far the best results for all around properties of resiliency, flexibility, corrosion resistance and satisfactory appearance—are obtained by using 15 to 35 parts by weight of the coumarone-indene resin.

In the present invention, the modifying agent is preferably a liquid coumarone-indene resin having a molecular weight of about 500 to 2000 or more.

Suitable coumarone-indene resins, liquid and solid, having an average molecular weight of up to about 3000 or more are sold as Cumar paracoumarone-indene resins by the Barrett Division of the Allied Chemical and Dye Corporation, New York, New York, as will hereinafter be described in more detail.

Generally, courmarone-indene resins are manufactured by treating unsaturated fractions of distallates of tars from the distillation of coal and from water gas operations with an acid-type catalyst. Also, different streams of distillates may be blended to be polymerized together and produce modified coumarone-indene resins.

Low molecular polystyrene resins, somewhat similar to coumarone-indene resins, can be used with advantage in amounts of about 5 to 50% by weight of the coumarone-indene resin.

In general the coumarone-indene resins that are preferred modifiers of the present invention are sold under the trade names Cumar, Neville, Nevidene, Paradene and Piccoumaron. These commercially available polymers are generally catalytic polymers which have generally more commercial uses than the heat polymers or hydrogenated resins of the coumarone-indene type. Generally, the preferred coumarone-indene resin of the present invention has a relatively low melting point about 5 to 30° C. melting point (cube-in-mercury method).

In preparing the preferred coumarone-indene resins of the present invention, the refined heavy solvent of coal-tar light oil is treated with a catalyst under conditions where the temperature, polymerizable content and catalytic volume are controlled. Generally, the reaction with sulfuric acid is practically instantaneous and highly exothermic, the higher melting point resins being obtained at a lower starting reaction temperature than the lower melting point resins. With a catalyst such as an alkyl sulfonic acid or a metal halide, more uniform polymers are produced and the reaction is capable of being conducted over longer periods of time—allowing greater chain growth. When the reaction is complete, the acid tars and sludges are allowed to settle and the catalyst removed. The treated polymer is then solvent distilled to remove volatile constituents (dimers and trimers may be removed by steam distillation). Generally, steam distillation is continued until the desired softening point is reached, the color depending upon refinement before and after polymerization.

In producing the higher melting point resins, the molten resin may be poured into containers after the molten resin is passed over a rotary drum to get a thin film which is then flaked and bagged or placed in the suitable containers. Some manufacturers produce the resins in solution form also.

Continuing to describe the types of coumarone-indene polymers, the preferred resin is a catalytic (regular) polymer according to the present invention. The catalytic polymers generally have the palest color, and the highest molecular weight is obtained when purified solvent naphtha fractions are treated with concentrate sulfuric acid, hydrofluoric acid or the halides of aluminum, zinc, boron, tin, iron and antimony. Resins of pale color but narrow molecular weight bands are obtained by the use of an alkyl sulfuric acid catalyst.

In the present invention, as previously indicated, by far the best coumarone-indene resin is a liquid resin such as Coumar P-10. This liquid resin has, in addition to its compatibility with epoxy resins, an unusual modifying power therewith. The preferred liquid modifying resin has the following properties:

Softening point of about 7–16° C.
Color designation (Barrett Standard) of 3–6
Ash (maximum percent) of 0.1
Viscosity of that of a viscous liquid
Approximate specific gravity at 15.5° C./15.5° C. of 1.08
Flash point of about 320° F.
Iodine member of 44
Average molecular weight of about 400 to 700

Other coumarone-indene resins from coal tar distillates that may be used in the present invention generally have higher molecular weights and are particularly suitable for use with solid epoxy resins. The higher molecular are those having weight ranges, of say at least 800 up to 4000 or more. Generally Barrett "Cumar" resins are suitable and have the following properties:

CUMAR RESINS

| Barrett Grade | Color Designation Barrett-Standard | Softening Point | | Ash (max. percent) |
|---|---|---|---|---|
| | | ° C. | ° F. | |
| W | 1, 1½, 2, 2½ | 128–136 | 262–277 | 0.1 |
| V | 1, 1½, 2, 2½, 3 | 109–117 | 228–243 | 0.1 |
| T3 | 3½ max | 109–117 | 228–243 | 0.1 |
| T15 | 12–16 | 86–99 | 187–210 | 1.0 |
| MH | 1, 1½, 2, 2½, 3 | 99–108 | 210–225 | 0.1 |
| RH | 2–6 | 67–74 | 153–165 | 0.1 |
| P25 | 3–6 | 20–28 | 68–82 | 0.1 |
| Ex Light | 16 max | 86–99 | 187–210 | 1.0 |
| Ex Dark | 17–24 | 86–99 | 187–210 | 1.0 |

| Barrett Grade | Form | Approx. Specific Gravity | Flash Point | | Iodine Number |
|---|---|---|---|---|---|
| | | | ° C. | ° F. | |
| W | Chipped | 1.140 | 278 | 532 | 42 |
| V | do | 1.135 | 232 | 450 | 43 |
| T3 | Solid | | | | 43 |
| T15 | do | 1.080 | 177 | 350 | 41 |
| MH | Chipped | 1.130 | | | 43 |
| RH | Solid | 1.090 | | | |
| P-10 | Viscous Liquid | 1.080 | 160 | 320 | 44 |
| P25 | do | 1.085 | 166 | 330 | 44 |
| Ex Light | Solid | 1.080 | 177 | 350 | 41 |
| Ex Dark | do | 1.080 | 177 | 350 | 41 |

Thus, the preferred polymers are those produced from distillates having a boiling range of 160° to 200° C. While, in general, the modifying polymers of the present invention can be a polymer from a coal-tar distillate having a boiling range of as low as 140 to as high as 210° C., the resultant compositions are not as good as those produced by modifiers in the 150 to 200° C. range.

A preferred epoxy resin for use in the present invention is a liquid condensation product of bisphenol A and epichlorohydrin having a relatively low molecular weight of about 350–400 and epoxy equivalent weight of 180–200. A preferred epoxy resin available commercially is ERL–2774, a liquid epoxy resin sold by the Union Carbide Plastics.

While liquid and solid epoxy resins can be used in the present invention, a liquid resin produces by far the best end product. In general, epoxy resins, having a molecular weight of 350–400 and epoxy equivalent weight of 185–195, produce good coatings and tank linings in accordance with the present invention.

In general, epoxy resins that are suitable in the present invention are condensation products of an aliphatic organic compound having an ethylene oxide on at least one of its chain ends such as epichlorohydrin (1-chloro-2,3-epoxy propane) and an organic polyhydric alcohol having 2 to 3 hydroxyl groups and having 3 to 17 carbon atoms such as bisphenol A (2,2-p-hydroxy phenyl propane), bisphenol C (2,2-bis (4-hydroxy-5-methyl phenyl) propane), glycerol and ethylene glycol. As previously indicated, the preferred epoxy resins are condensation products of bisphenol A with epichlorohydrin having hydroxyl groups and terminal epoxide groups in their structure. In general, the epoxy resins may have molecular weights from 350 to 4000 although the lower molecular weight epoxy resins are the preferred resins of the present invention. Generally, as previously pointed out, resins in the 350 to 450 molecular weight range are liquids although solid epoxy resins can be advantageously used in the present invention by dissolving the same with about 5 to 40% by weight of an organic reactive diluent such as allyl glycerol glycidyl ether, allyl glycidyl ether, butyl glycidyl ether and phenyl glycidyl ether. Even the lower molecular epoxy resins may be obtained with about 5 to 25% by weight of the above described diluents. An example of a straight low molecular weight epoxy resin is ERL–2774, a liquid condensation product having a molecular weight of about 384. An example of a diluted epoxy resin (a preferred epoxy resin material), is ERL–2795, which is the ERL–2774 resin diluted with butyl glycidyl ether in which the diluent is about 15% by weight of the epoxy resin.

Other properties of the above mentioned preferred resins are an epoxide equivalent weight of about 150 to 250, a viscosity of about 500 to 16,000 centipoises at 77° F. In general, the liquid epoxy resins will have an epoxide equivalent weight greater than 100 and not greater than 400, the epoxide equivalent weight being defined as the weight in grams of resin containing one gram equivalent of epoxide.

With the above described modified epoxy resin composition of 50 parts epoxy resin and about 5 to 75 parts by weight of coumarone-indene resin, it is difficult to find a compatible curing agent. It has been found that an adduct of a liquid condensation product of bisphenol A and epichlorohydrin having a molecular weight of about 350 to 450 or other low molecular weight epoxy resin with (2) N-amino ethyl piperazine provides excellent compatibility with the coumarone/epoxy resin combination throughout the whole range of amount of the modifying resin. Furthermore, the above described adduct cures the epoxy resin with a low heat exotherm which is advantageous for many applications such as by preventing the formation of cracks and bubbles in thicker sections.

Other types of hardeners generally preferred in the present invention are ambient hardeners such as primary and secondary aliphatic polyamines including diethylene triamine, tetraethylene pentamine, and tri-ethylene tetramine.

The epoxy resins generally can be cured by many compounds containing an active hydrogen such as the aliphatic and aromatic polyamines already described, acid anhydrides such as phthalic anhydride, and flexible hardeners including Versamid and Genamid resins sold by General Mills, Inc., which are polyamids prepared from polymerized vegetable oil acids and polyamino compounds, and Doumeen hardeners sold by Armour and Company. Also, the epoxy resins can be cured by catalysts that promote the self-polymerization of the resin such as tertiary amine-boron trifluoride complexes.

Also useful as additives to the above cumarone-indene epoxy resin composition are solvents and diluents such as aromatic hydrocarbon vehicles including xylol, toluol, benzol, reactive diluents, and the like. These aromatic hydrocarbon vehicles generally are useful in changing a too-viscous composition to one with a workable consistency.

Pine oil is also a useful additive in the compositions of the present invention. When added in amounts of generally 2 to 20 or preferably 5 to 15 parts by weight based on 50 parts by weight of the epoxy resin, generally the resultant compositions are improved.

The following examples are set forth to describe the present invention and not limit it in any way:

Example 1

An epoxy resin composition was made with the following formulation:

| Ingredients: | Parts by weight |
|---|---|
| Epoxy resin, liquid, epoxy equivalent weight 180-200 | 50 |
| Coumarone-indene resin, liquid | 25 |
| Curing agent, tetra ethylene pentamine | 6 |
| Xylol | 5 |

The above ingredients were mixed together by combining the epoxy resin and coumarone-indene resin and then adding the curing agent and the xylol to provide a desirable composition. The composition formed an excellent coating over concrete, the coating having outstanding corrosion resistance, adhesion, flexibility and abrasion resistance.

Example 2

A series of epoxy resin coumarone-indene resins were made according to the method and procedure described in Example 1 except that coumarone-indene resin was added in amounts of 20 parts by weight and 60 parts by weight per 50 parts by weight of the epoxy resin. The resultant compositions formed excellent hard, corrosion resistant coatings.

Example 3

Two epoxy resin compositions were prepared according to the method described in Example 1 except that different amounts of coumarone-indene resin were used. One composition was prepared using only two parts by weight of coumarone-indene resin and another was prepared using 80 parts by weight of coumarone-indene resin.

Neither of the resultant compositions was satisfactory. The composition with 2 parts coumarone-indene resin per 50 parts epoxy resin was very much like an unmodified epoxy resin and did not have any valuable modified properties. The resultant composition containing 80 parts by weight of coumarone-indene resin was too flexible and resilient, desirable epoxy resin properties were modified to give a thermoplastic-like property to the whole composition and the resultant strength, and wear resistance were not as desirable as they should be for a good coating over steel or concrete.

In the above examples, other curing agents such as an N-amino akyl piperazine in which the akyl radical has from about 1 to 5 carbon atoms including N-amino ethyl piperazine and N-amino propyl piperazine may be substituted in whole or part for the tetrathylene pentamine.

Since it is obvtious that many changes and modifications can be made in the above described details without departing from the nature and spirit of the invention, it is to be understood that the invention is not limited to said details except as set forth in the appended claims.

What is claimed is:

1. A composition comprising about 50 parts by weight of a reaction product of epichlorohydrin and an organic polyhydric alcohol having two or three hydroxyl groups and 3 to 17 carbon atoms, the reaction product having an epoxide equivalent weight greater than about 100, about 5 to 75 parts by weight of a thermoplastic coumarone-indene resin that is a polymer of a distillate of the group consisting of coal tar, water gas tar and petroleum tar, the distillate having the properties and polymerizable ingredients of a coal-tar distillate having a boiling point of about 80° C. to 210° C., said polymerizable ingredients therein including coumarone and indene that are polymerizable to a coumarone-indene resin, and about 1 to 12 parts by weight of a curing agent for said reaction product.

2. A composition comprising about 50 parts by weight of a condensation product of epichlorohydrin and 2,2-(p-hydroxyphenyl) propane having an epoxide equivalent weight greater than about 100, about 5 to 75 parts by weight of a thermoplastic coumarone-indene resin that is a polymer of a coal-tar distillate having a softening point of about 7° to 28° C., the coal-tar distillate having a boiling point of about 160° C. to 200° C. and containing coumarone and indene as polymerizable ingredients and about 1 to 12 parts by weight of a curing agent for said condensation product.

3. A composition comprising about 50 parts by weight of a liquid epoxy resin having a molecular weight of about 350–450, the epoxy resin being a reaction product of epichlorohydrin and an organic polyhydric alcohol having two to three hydroxyl groups and 3 to 17 carbon atoms, the reaction product having an epoxide equivalent weight greater than about 100, about 30 to 40 parts by weight of a liquid thermoplastic coumarone-indene resin that is a polymer of a coal-tar distillate, the distillate having a boiling point of about 160° C. to 200° C. and containing coumarone and indene as polymerizing ingredients, about 5 to 15 parts by weight of an aromatic hydrocarbon solvent, about 5 to 15 parts by weight of pine oil, and about 4 to 8 parts by weight of a primary amine curing agent for said epoxy resin.

4. A composition comprising about 50 parts by weight of a liquid epoxy resin having a molecular weight of about 350 to 450, the epoxy resin being a reaction product of an epichlorohydrin and 2,2-(p-hydroxyphenyl) propane having an epoxide equivalent weight of about 100 to 400, about 30 to 40 parts by weight of a liquid thermoplastic coumarone-indene resin that is a polymer of a coal tar distillate, the distillate having a boiling point of about 160° C. to 200° C. and containing coumarone and indene as polymerizable ingredients therewithin, and about 4 to 8 parts by weight of a primary amine.

5. A composition comprising about 50 parts by weight of a liquid epoxy resin, the epoxy resin being a reaction product of epichlorohydrin and 2,2-(p-hydroxyphenyl) propane having an epoxide equivalent weight of about 100 to 400, about 25 to 35 parts by weight of a liquid coumarone-indene resin that is a polymer of a coal tar distillate, the distillate having a boiling point of about 160° C. to 200° C. and containing coumarone and indene as polymerizable ingredients therewithin, and about 4 to 8 parts by weight of a polyamine curing agent for the epoxy resin.

6. A composition comprising about 50 parts by weight of a liquid epoxy resin having a molecular weight of about 350 to 450, the epoxy resin being a reaction product of epichlorohydrin and 2,2-(p-hydroxyphenyl) propane having an epoxide equivalent weight of about 100 to 400, about 25 to 35 parts by weight of a liquid coumarone-indene resin that is a polymer of a coal tar distillate, the distilllate having a boiling point of about 160° C. to 200° C. and containing coumarone and indene as polymerizable ingredients therewithin, and about 6 to 10 parts by weight of diethylene triamine.

7. A composition comprising (1) about 50 parts by weight of a liquid epoxy resin, the epoxy resin being a reaction product of epichlorhydrin and 2,2-(p-hydroxyphenyl) propane having an epoxide equivalent weight of about 100 to 400, (2) about 25 to 35 parts by weight of a liquid coumarine-indene resin that is a polymer of a coal tar distillate, the distillate having a boiling point of about 160° C. to 200° C. and containing coumarone and indene as polymerizable ingredients therewithin, and (3) about 6 to 10 parts by weight of tetraethylene pentamine.

8. A composition comprising (1) about 50 parts by weight of a liquid epoxy resin, the epoxy resin being a reaction product of epichlorohydrin and 2,2-(p-hydroxyphenyl) propane having an epoxide equivalent weight of about 100 to 400, (2) about 25 to 35 parts by weight of a liquid coumarone-indene resin that is a polymer of a coal tar distillate, the distillate having a boiling point of about 160° C. to 200° C. and containing coumarone and indene as polymerizable ingredients therewithin, and (3)

about 8 to 14 parts by weight of N-amino ethyl piperazine.

9. A composition adapted for coating steel and concrete comprising 50 parts by weight of a liquid epoxy resin, the epoxy resin being a reaction product of epichlorohydrin and 2,2-(p-hydroxyphenyl) propane having an epoxide equivalent weight of about 100 to 400, about 25 to 32 parts by weight of a liquid thermoplastic coumarone-indene resin that is a polymer of a coal-tar distillate boiling at about 160° C. to 200° C. and comprising coumarone and indene among its polymerizable ingredients, about 8 to 12 parts by weight of pine oil and about 8 to 12 parts by weight of an aromatic hydrocarbon diluent and about 4 to 14 parts of a curing agent for the epoxy resin.

10. A method of making a coating suitable for covering steel and concrete comprising (1) mixing 50 parts by weight of an epoxy resin, the epoxy resin being a reaction product of epichlorohydrin and 2,2-(p-hydroxyphenyl) propane having an epoxide equivalent weight of about 100 to 400 with about 5 to 75 parts by weight of a thermoplastic coumarone-indene resin that is a polymer of a coal-tar distillate, the distillate having a boiling point of about 160° C. to 200° C. and containing coumarine and indene as polymerizable ingredients therewithin having a boiling point of about 160° C. to 190° C. to form a mixture, (2) adding to said mixture and mixing therewith about 1 to 12 parts by weight of a curing agent to form a liquid composition, and (3) thereafter applying said composition to a base to form a strong tough corrosion resistant coating thereupon.

11. A method of making a coating suitable for covering steel and concrete comprising (1) mixing 50 parts by weight of an epoxy resin, the epoxy resin being a reaction product of epichlorohydrin and 2,2-(p-hydroxyphenyl) propane having an epoxide equivalent weight of about 100 to 400 with about 5 to 75 parts by weight of a thermoplastic coumarone-indene resin that is a polymer of a coal-tar distillate, the distillate having a boiling point of about 160° C. to 200° C. and containing coumarone and indene as polymerizable ingredients therewithin to form a mixture, (2) adding to said mixture and mixing therewith about 1 to 12 parts by weight of a curing agent for the epoxy resin and about 2 to 20 parts by weight of an aromatic hydrocarbon solvent, and (3) curing the epoxy resin to form a strong tough corrosion resistant coating thereon.

12. A composition comprising (1) about 50 parts by weight of a liquid epoxy resin that is a reaction product of epichlorohydrin and 2,2-(p-hydroxyphenyl) propane having an epoxy equivalent weight of about 180 to 200 and a molecular weight of about 350 to 400, (2) about 25 parts by weight of a liquid coumarone-indene resin having a specific gravity of about 1.08, a flash point of about 160° C. and an iodine number of about 44, the coumarone-indene resin being a polymer of a coal-tar distillate boiling at a temperature of about 160° C. to 200° C. (3) about 6 parts by weight of tetra ethylene pentamine, and (4) about 5 parts by weight of xylol.

13. A composition comprising about 50 parts by weight of a liquid epoxy resin that is a reaction product of epichlorohydrin and 2,2-(p-hydroxyphenyl) propane having an epoxy equivalent weight of about 180 to 200 and a molecular weight of about 350 to 400, about 25 parts by weight of a liquid coumarone-indene resin having a specific gravity of about 1.08, a flash point of about 160° C., an average molecular weight of about 400 to 700, and an iodine number of about 44, the coumarone-indene resin being a polymer of a coal tar distillate boiling at a temperature of about 160° C. to 200° C., about 6 parts by weight of tetra ethylene pentamine, about 5 to 15 parts by weight of pine oil, and about 5 parts by weight of xylol.

References Cited by the Examiner

UNITED STATES PATENTS

| | | | |
|---|---|---|---|
| 2,300,193 | 10/1942 | Allen | 260—23.3 |
| 2,528,417 | 10/1950 | Bradley | 260—28 |
| 2,765,288 | 10/1956 | Whittier et al. | 260—28 |
| 3,015,635 | 1/1962 | Bradley et al. | 260—18 |
| 3,058,839 | 10/1962 | Kemp | 260—28 |

OTHER REFERENCES

Lee and Neville, Epoxy Resins, McGraw-Hill, New York, 1957, 305 pages, pages 269–272 relied upon (copy in Scientific Library).

MURRAY TILLMAN, *Primary Examiner.*

LEON J. BERCOVITZ, *Examiner.*

R. W. GRIFFIN, R. LIEBERMAN, *Assistant Examiner.*